US008464155B2

(12) United States Patent
Militante et al.

(10) Patent No.: US 8,464,155 B2
(45) Date of Patent: Jun. 11, 2013

(54) METHOD AND SYSTEM FOR FACILITATING DELIVERY OF CONTENT

(75) Inventors: Chester A. Militante, North Hollywood, CA (US); Giang Nguyen, Corona, CA (US); James Crosby, Covina, CA (US); Neal Lassila, Valencia, CA (US); Rob Lawrence, Rancho Palos Verdes, CA (US); Joksan Alcala, Ranch Cucamonga, CA (US); Kenneth W. Shue, La Canada Flintridge, CA (US); Joseph M. Solimando, Redondo Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 884 days.

(21) Appl. No.: 11/805,072

(22) Filed: May 21, 2007

(65) Prior Publication Data

US 2008/0294993 A1    Nov. 27, 2008

(51) Int. Cl.
 *G06F 3/00*    (2006.01)
 *G09G 3/28*    (2006.01)
(52) U.S. Cl.
 USPC .......................................... 715/733; 715/716

(58) Field of Classification Search
 USPC .................................................. 715/716, 733
 See application file for complete search history.

(56) References Cited

U.S. PATENT DOCUMENTS

| 6,975,308 | B1 * | 12/2005 | Bitetto et al. ................. 345/204 |
| 7,730,223 | B1 * | 6/2010 | Bavor et al. ........................ 710/8 |
| 2004/0044723 | A1 * | 3/2004 | Bell et al. ....................... 709/203 |
| 2007/0281692 | A1 * | 12/2007 | Bucher et al. ............. 455/435.1 |
| 2009/0131020 | A1 * | 5/2009 | van de Groenendaal ..... 455/411 |

* cited by examiner

*Primary Examiner* — Ryan F Pitaro
*Assistant Examiner* — Andrea Leggett
(74) *Attorney, Agent, or Firm* — Farjami & Farjami LLP

(57) ABSTRACT

There is provided a method for use by a server for facilitating delivery of content to a number of display devices. Each of the display devices can include, for example, an output display and a personal computer. In one embodiment, content is received from a computer coupled to the server. The content can be, for example, an image, video, or audio data. The content is stored in a source storage file, which is associated with a number of display devices coupled to the server. A group synchronization command is then received from the computer. Thereafter, the content is provided to a group of synchronization files associated with the source storage file. The content is then transmitted from the group of synchronization storage files to the number of display devices.

18 Claims, 4 Drawing Sheets

METHOD AND SYSTEM FOR FACILITATING DELIVERY OF CONTENT

BACKGROUND OF THE INVENTION

1. Field of the Invention

The present invention relates generally to techniques for managing content. More particularly, the present invention relates to systems and techniques for delivering content.

2. Background Art

Electronic display devices, such as digital photo frames, have become extremely popular with consumers and businesses alike as an interesting and attractive way to display content. Such display devices are simple to operate and are capable of displaying several types of content, such as images and videos. More importantly, these display devices support many of the formats commonly used in the consumer electronics industry and thus, the content can typically be quickly and conveniently displayed without requiring substantial processing. For example, owners of digital cameras can transfer their content from their digital cameras into the display devices to instantly display and view their content. Moreover, businesses ranging from travel agencies to amusement parks typically utilize such display devices for a variety of business purposes, such as advertising, promoting events and activities, and even for entertaining their patrons.

However, as the number of display devices and the volume of content generated by the consumers or businesses increases over time, it has also become increasingly very difficult to continually update the content displayed by the display devices. For example, businesses and other establishments that utilize a large number of these display devices throughout their property may find it very inconvenient and time consuming to update and customize the content in each of the display devices. More specifically, since the content to be displayed by a display device must be delivered directly to the display device, the current techniques for organizing and distributing content to a number of display devices have become inadequate.

SUMMARY OF THE INVENTION

There is provided methods and systems for facilitating delivery of content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
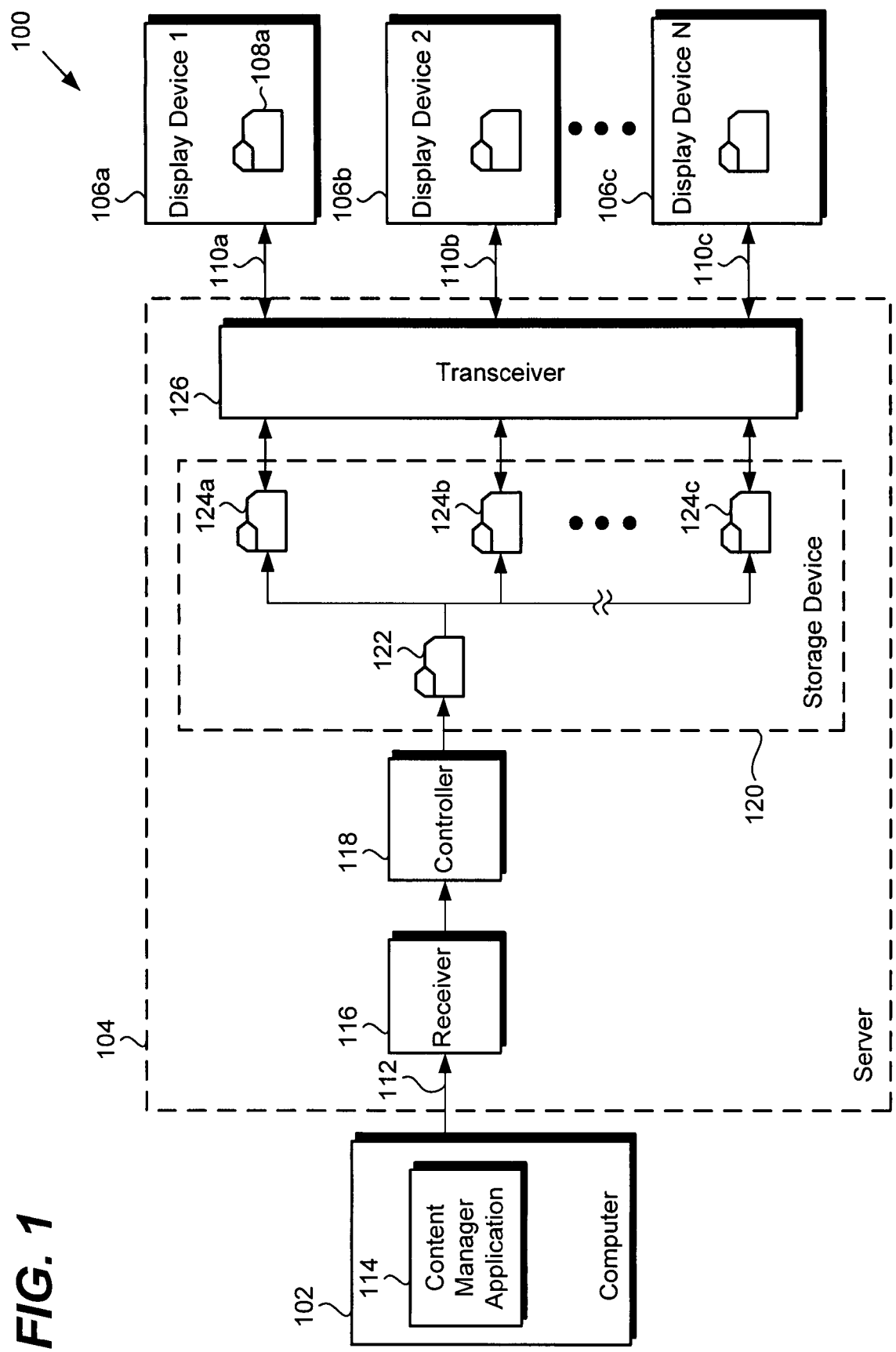
FIG. 1 illustrates a block diagram of a system for delivering content to a number of display devices, in accordance with one embodiment of the invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 illustrates a block diagram of system 100 for delivering content to a number of display devices, in accordance with one embodiment of the invention. System 100 includes computer 102, server 104, and display devices 106a, 106b, and 106c. As shown in FIG. 1, computer 102 is in communication with server 104 via data path 112. Computer 102 can be, for example, a personal computer or any other type of computer. Data path 112 can be, for example, a network cable or a wireless communication link. As further shown in FIG. 1, computer 102 includes content manager application 114, which as discussed below, can be used to provide server 104 various content that can be displayed by one or more display devices, such as display devices 106a, 106b, and 106c. In one embodiment, the content can be rich media content, which might include images, videos, and audio data.

As shown in FIG. 1, server 104 includes receiver 116, controller 118, storage device 120, and transceiver 126. Server 104 can be configured to receive the content transmitted by computer 102 at receiver 116. It is important to note that system 100 can include additional computers similar to computer 102, which can also be used to provide content to server 104. Receiver 116 can be, for example, a volatile or non-volatile memory device configured to buffer the content. As also shown in FIG. 1, controller 118 can receive the content from receiver 116 and can provide the content to storage device 120. Controller 118 can be, for example, a microcontroller or a microprocessor. In one embodiment, storage device 120 can be a local storage device, such as a hard disk, situated in server 104. In other embodiments, storage device 120 can be located outside of server 104.

In the embodiment shown in FIG. 1, storage device 120 includes source storage file 122, which is associated with a group of synchronization storage files having synchronization storage files 124a, 124b, and 124c. In other embodiments, storage device 120 can include a different number of source storage files and synchronization storage files. Thus, in the embodiment shown in FIG. 1, synchronization storage files 124a and 124b represent the first and second synchronization storage files in storage device 120, respectively, while synchronization storage file 124c represents the nth synchronization storage file. In one embodiment, controller 118 can be configured to provide the content received from receiver 116 to source storage file 122. In such an embodiment, controller 118 can be further configured to provide the content to each of the synchronization storage files in the group of synchronization storage files associated with the source storage file, i.e., synchronization storage files 124a, 124b, and 124c. In another embodiment, controller 118 can be configured to provide the content directly to one or more of the synchronization storage files in storage device 120.

As shown in FIG. 1, each synchronization storage file is associated with a display device coupled to server 104. More specifically, in the embodiment shown in FIG. 1, synchronization storage file 124a is associated with display device 106a (also referred to as "display device 1"), synchronization storage file 124b is associated with display device 106b (also referred to as "display device 2"), and synchronization storage file 124c is associated with display device 106c (also referred to as "display device N"). System 100 can include a different number of display devices, and display devices 106a and 106b represent the first and second display devices in system 100, respectively, while display device 106c represents the nth display device.

Continuing with FIG. 1, computer 102 can be configured to send a command to one or more of the display devices, which can be used to prompt a display device to check the contents of its associated synchronization file. For example, computer 102 can send a command to display device 106a through server 104, which can prompt display device 106a to check the contents of synchronization file 124a. If the display device receiving the command determines that its associated synchronization file has changed, e.g., if new content has been added to the synchronization file, then the display device can be configured to receive the new content via transceiver 126 and to display the new content. In another embodiment, the content in a synchronization storage file in storage device 120 can be automatically transmitted to a display device associated with the synchronization storage file using transceiver 126. Transceiver 126 can be, for example, a Wi-Fi module, a Bluetooth module, an Ethernet adapter, or any other type of network communication device. For example, content stored in synchronization storage file 124a can be transmitted to display device 106a over data path 110a, content stored in synchronization storage file 124b can be transmitted to display device 106b over data path 110b, and content stored in synchronization storage file 124c can be transmitted to display device 106c over data path 110c. Data paths 110a, 110b, and 110c can each be, for example, a physical connection, such as a physical communication bus, or a wireless connection, such as a wireless local area network ("LAN") connection. As shown in FIG. 1, each display device, such as display device 106a, can be configured to store the content transmitted from server 102 in a local storage file, such as local storage file 108a.

Figure 2:
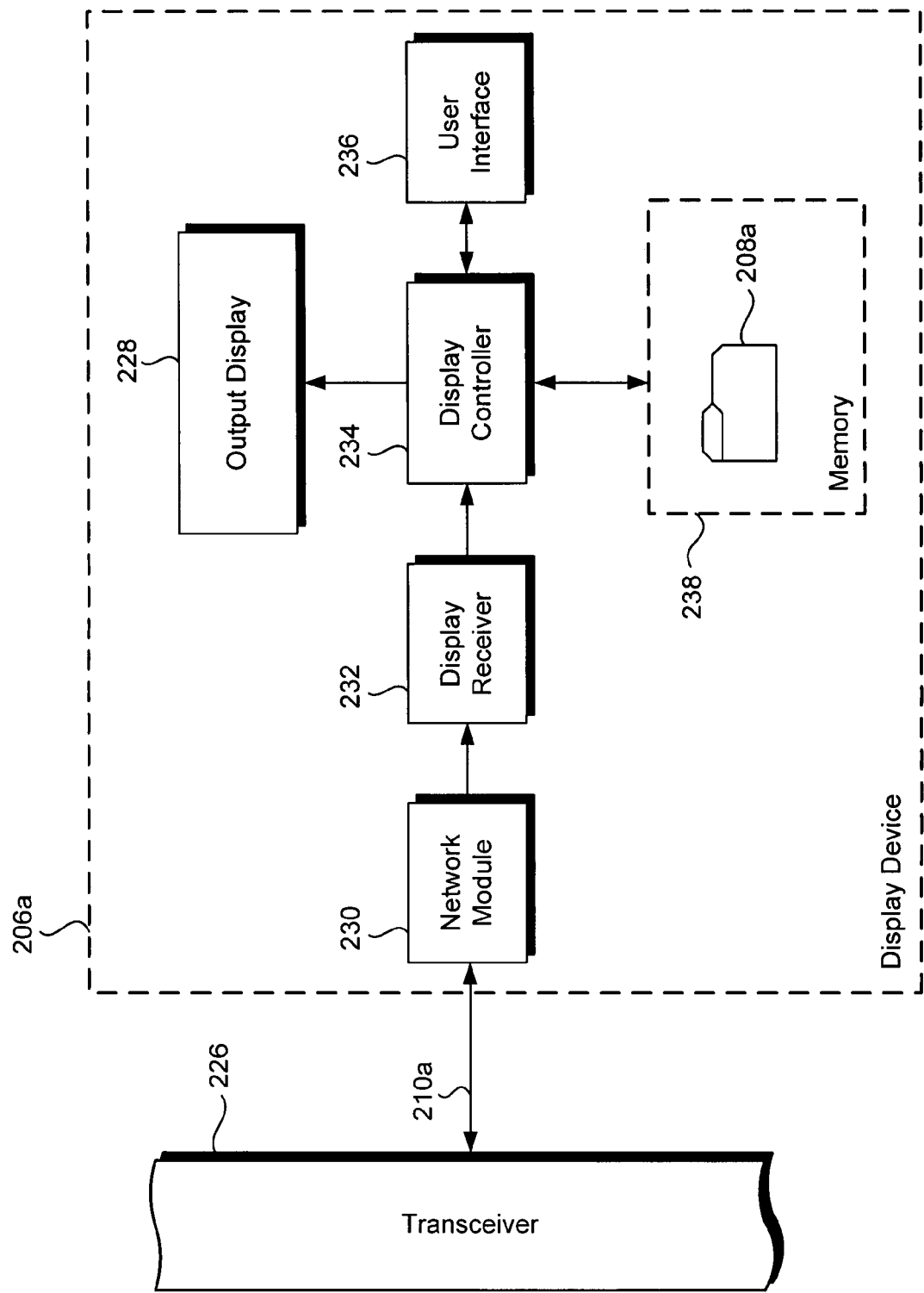
FIG. 2 illustrates a block diagram of a display device, in accordance with one embodiment of the invention.

The operation of the display devices shown in FIG. 1, such as display device 106a, will now be discussed with reference to FIG. 2. FIG. 2 shows a block diagram of a display device in accordance with one embodiment of the present invention. As shown in FIG. 2, display device 206a includes output display 228, network module 230, display receiver 232, display controller 234, user interface 236, memory 238, and local storage file 208a. In particular, display device 206a, transceiver 226, data path 210a, and local storage file 208a in FIG. 2 correspond to display device 106a, transceiver 126, data path 110a, and local storage file 108a in FIG. 1, respectively. It should be understood that the embodiment shown in FIG. 2 refers only to display device 106a in FIG. 1 for brevity purposes and that display devices 106b and 106c shown in FIG. 1 may include a similar configuration of elements as display device 206a shown in FIG. 2.

As also shown in FIG. 2, display device 206a can communicate with transceiver 226 via data path 210a using network module 230. Network module 230 can be, for example, a Wi-Fi module, a Bluetooth module, an Ethernet adapter, or any other type of network communication device. As further shown in FIG. 2, network module 230 can be configured to provide content transmitted by transceiver 226 to display receiver 232. Display receiver 232 can be, for example, a volatile or non-volatile memory device configured to buffer the received content. As shown in FIG. 2, display controller 234 can be configured to receive the content and to store the content in local storage file 208a situated in memory 238. Memory 238 can be, for example, any suitable type of memory device, such as a hard disk or flash memory.

Display controller 234 in FIG. 2 can be configured to execute various applications, such as a screensaver application and/or an application for viewing movie files, such as "QuickTime" by Apple Inc. Accordingly, display controller 234 can be configured to access the content in local storage file 208a and to display the content on output display 228 using an appropriate application. Moreover, display controller 234 can be configured to receive, for example, data and various commands input by a user through user interface 236. For example, user interface 236 can include one or more input devices, such as a keyboard, a keypad, and a pointing device. User interface 236 can further include additional interfaces, such as a USB interface, for receiving and transmitting content through various portable storage media, such as a USB flash drive.

Output display 228 in FIG. 2 can be, for example, a plasma display, a liquid crystal is display ("LCD"), or any other type of display panel. In one embodiment, output display 228 can be a touch-sensitive display panel, in which case the one or more input devices discussed above can be included in the display panel itself. In one embodiment, output display 228 can be housed in an enclosure resembling a picture frame and network module 230, display receiver 232, display controller 234, user interface 236, and memory 238 can be situated in a personal computer, such as the "Mac mini" personal computer manufactured by Apple Inc.

Figure 3:
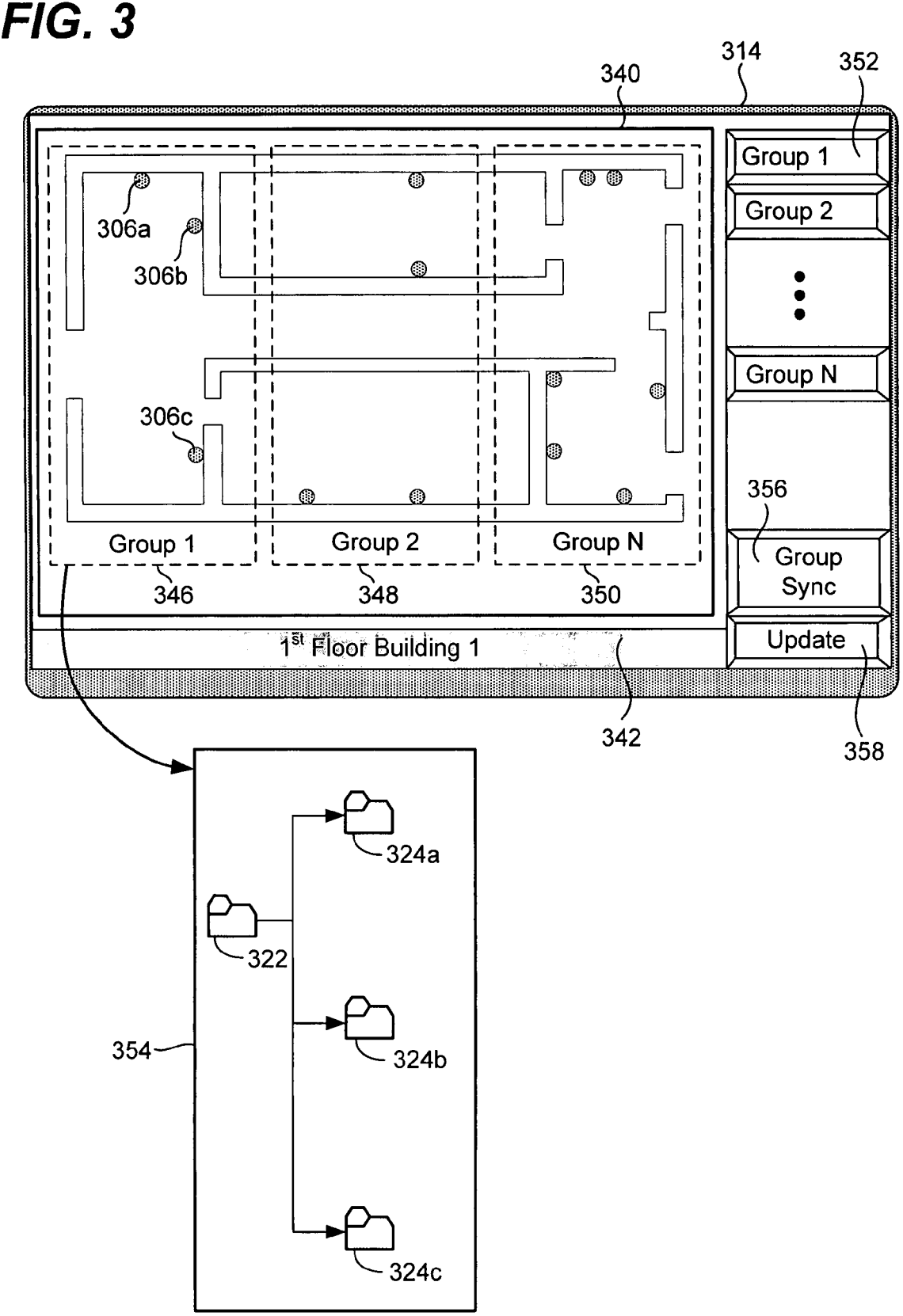
FIG. 3 illustrates an example operation of a content manager application, in accordance with one embodiment of the invention.

FIG. 3 shows an example operation of content manager application 114 shown in FIG. 1. FIG. 3 includes application window 314, which can be for example, a graphical user interface ("GUI") that enables a user to control the delivery of content to the display devices shown in FIG. 1, such as display device 106a. As shown in FIG. 3, application window 314 includes floor plan 340, which as indicated in field 342 of application window 314, illustrates an example layout of the first floor of example building 1. In other embodiments, floor plan 340 can be a floor plan of a different location or structure, such as a theme park, a movie theater, a shopping mall, or a restaurant. As also shown in FIG. 3, floor plan 340 includes a number of display device markers, such as display device markers 306a, 306b, and 306c, which indicate the locations of the display devices situated on the first floor of building 1. In the embodiment shown in FIG. 3, display device markers 306a, 306b, and 306c represent display devices 106a, 106b, and 106c in FIG. 1, respectively. In one embodiment, the display device markers can be grouped together in one or more groups. For example, as shown in FIG. 3, the display device markers in region 346 are in a first group (also referred to as "group 1"), the display device markers in region 348 are in a second group (also referred to as "group 2"), and the display device markers in region 350 are in an nth group (also referred to as "group N").

In one embodiment of the present invention, application window 314 may be used by a user to deliver content to one or more groups of display devices situated in the first floor of building 1. For example, if the user desires to deliver content to display devices 106a, 106b, and 106c in FIG. 1, the user may select the group select button indicating group 1 in application window 314, such as group select button 352. After the user has selected the desired group of display device markers representing the display devices to which the content is to be delivered, a directory window including the storage files associated with those display devices is opened. For example, as shown in FIG. 3, if a user selects group select button 352 indicating group 1, directory window 354 can be opened. As shown in FIG. 3, directory window 354 includes source storage file 322 and synchronization storage files 324a, 324b, and 324c. Source storage file 322 and synchronization storage files 324a, 324b, and 324c shown in FIG. 3 correspond to source storage file 122 and synchronization storage files 124a, 124b, and 124c in FIG. 1, respectively.

Once directory window 354 has been opened, the user may add the content to source storage file 322 shown in directory window 354 using a drag-and-drop technique. In so doing, and with reference to FIG. 1, the content can be sent to server 104 from computer 102. Thus, if the user adds the content to source storage file 322 in directory window 354 shown in FIG. 3, then controller 118 would provide the content to the corresponding source storage file in storage device 120, such as source storage file 122. The user may then initiate the transfer of the content in source storage file 122 to the group of synchronization storage files associated with source storage file 122 (i.e., to synchronization files 124a, 124b, and 124c) by selecting group sync button 356 shown in FIG. 3. For example, group sync button 356 can send a command (e.g., a group synchronization command) to server 104, which can use the group synchronization command to initiate the transfer of the content in source storage file 122 to the group of synchronization storage files associated with source storage file 122.

In another embodiment, the user may deliver content to a particular display device by selecting one or more individual display device markers in floor plan 340, without selecting an entire group of display device markers. For example, if a user desires to deliver content to only display device 106b in FIG. 1, the user may select display device marker 306b in FIG. 3 by using a mouse to click directly on display device marker 306b. Thereafter, directory window 354 can be opened. The user may then add content to the synchronization storage file in directory window 354 associated with the selected device marker, i.e., synchronization storage file 324b, using a drag-and-drop technique. In this embodiment, controller 118 in FIG. 1 would provide the content directly to the synchronization storage file in storage device 120 associated with synchronization storage file 324b, such as synchronization storage file 124b.

Referring back to FIG. 1, once the content has been stored in a synchronization storage file in storage device 120, server 104 can be configured to transmit the content in a synchronization storage file to the display device associated with the synchronization storage file using transceiver 126. In one embodiment, a user may initiate the transmission of content from the synchronization storage files to their associated display devices using content manager application 114. For example, as shown in FIG. 3, a user may select update button 358 in application window 314 to initiate the transmission of the content from the synchronization storage files in storage device 120 to their associated display devices. In one embodiment, update button 358 can be configured to initiate an "rsync" command, which is typically used in the art to facilitate the transfer of a computer file from one device to another. In another embodiment, the transmission of content can be initiated automatically by content manager application 114 at predetermined time periods.

Therefore, the present invention can greatly facilitate the delivery of content to a large number of display devices situated at various locations. For example, as shown in FIG. 3, the display devices corresponding to the display device markers in group 1 might be situated in a waiting area, whereas the display devices corresponding to the display device markers in group 2 might be situated inside different offices. As such, the invention advantageously allows convenient customization and delivery of the content displayed by each of the display devices based on their location and viewing audience. Thus, the display devices corresponding to the display device markers in group 1 might be delivered content that is intended to entertain, such as trailers for upcoming movies, while the display devices corresponding to the display device markers in group 2 might be delivered content that is intended to be decorative, such as scenic images.

Moreover, since content manager application 114 includes an intuitive graphical user interface ("GUI"), the invention greatly simplifies the complex processes involved in controlling and managing the delivery of content to the display devices coupled to server 104. Furthermore, because server 104 can communicate with the display devices over a wireless network, display devices can be easily added or removed from system 100 without having to install or remove costly cables between server 104 and the display devices. As such, system 100 is highly scalable and easy to maintain. In addition, the wireless delivery of content enables the invention to support many cutting edge content formats, such as high-definition video and Internet Protocol Television ("IPTV"), without having to substantially modify system 100.

Figure 4:
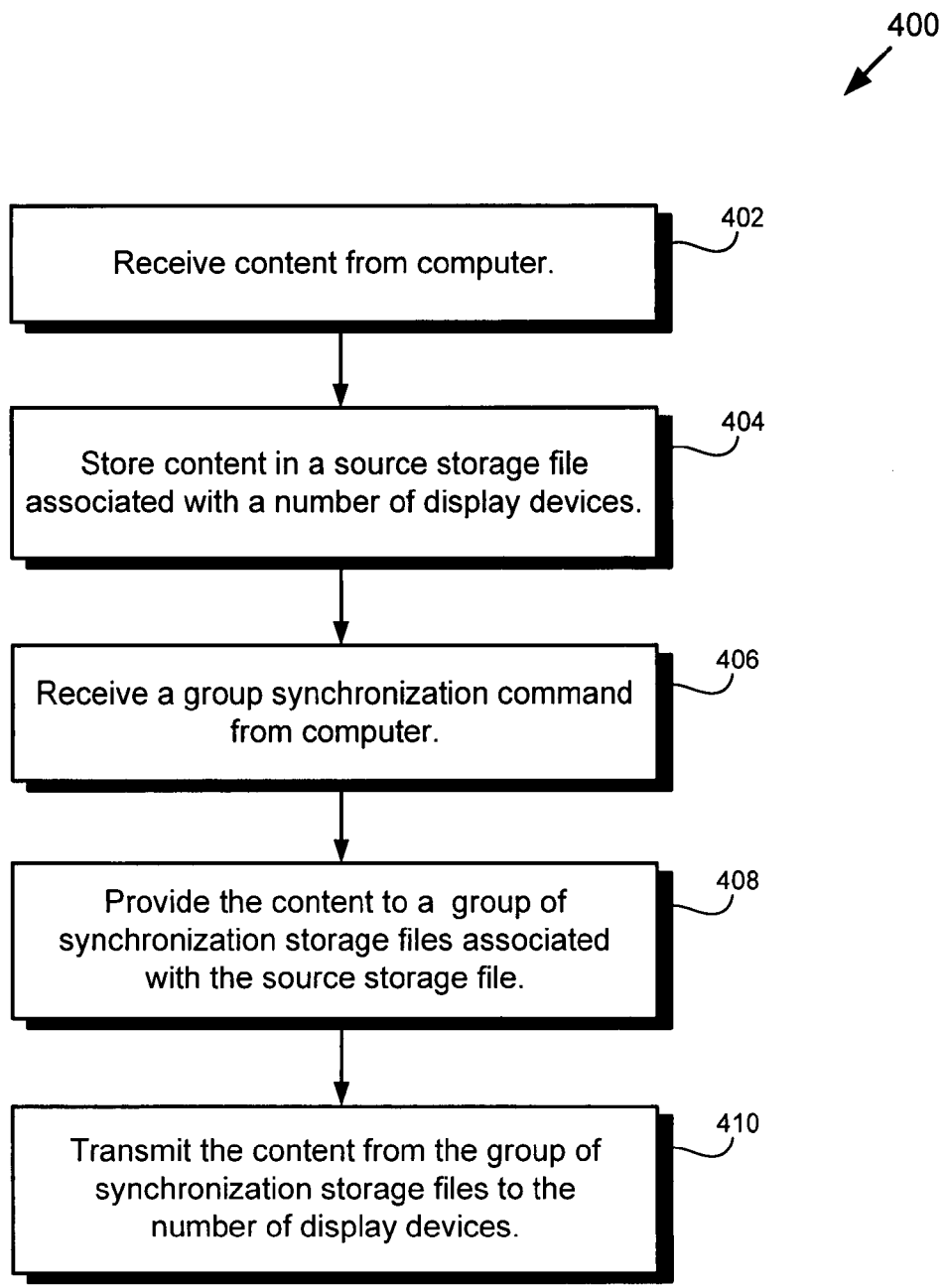
FIG. 4 illustrates a flowchart for performing a method for facilitating delivery of content, in accordance with one embodiment of the invention.

FIG. 4 illustrates flowchart 400 for performing an example method for facilitating delivery of content to a number of display devices in accordance with one embodiment of the present invention. With reference to the embodiment shown in FIG. 1 and as shown in FIG. 4, at step 402 of flowchart 400, content is received from computer 102. Then, at step 404, the content is stored in a source storage file, which is associated with a number of display devices. At step 406, a group synchronization command is received from computer 102. Then, at step 408, the content is provided to a group of synchronization storage files associated with the source storage file. At step 410, the content is transmitted from the group of synchronization storage files to the number of display devices.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a system having a server in communication with a computer for facilitating delivery of content to a plurality of display devices, said method comprising:

presenting by said computer to a user, using a content manager application having a graphical user interface ("GUI"), a floor plan having a plurality of groups of display devices, said floor plan including markers indicative of locations of each of said plurality of groups and each of said plurality of display devices in each of said plurality of groups;

receiving a selection of said content and a first group of display devices by said user using said GUI to select said first group of display devices of said plurality of display devices;

corresponding, using the GUI, said selection of said first group of display devices by said user from said floor plan to a first source file in said server associated with said first group of display devices, wherein said server includes a plurality of source files each associated with a different one of said plurality of groups of display devices;

transmitting said selected content by said computer to said first source storage file associated with said first group of display devices;

storing, by said server, said content in said first source storage file associated with said first group of display devices;

providing, by said server, said content to a group of synchronization storage files associated with said first source storage file, wherein each of said plurality of display devices in said first group of display devices is associated with a respective synchronization storage file in said group of synchronization storage files;

transmitting, by said server, said content from each of said group of synchronization storage files to each respective one of said plurality of display devices in said first group of display devices; and receive a command, by said server, from said computer to prompt said first group of display devices to check each of said group of synchronization storage files, respectively, to determine if said content is added, and if so, obtain said content from each of said group of synchronization storage files, respectively.

2. The method of claim 1 wherein said content is one of an image, video, or audio data.

3. The method of claim 1 wherein said source storage file resides in a storage device in said server.

4. The method of claim 3 wherein said storage device is a hard disk.

5. The method of claim 1 wherein each of said plurality of display devices includes an output display and a personal computer.

6. The method of claim 5 wherein said output display is one of a plasma display panel or a liquid crystal display ("LCD").

7. The method of claim 1 wherein said transmitting said content is performed over a wireless network.

8. The method of claim 1 further comprising receiving a group synchronization command from said computer prior to said providing said content to said group of synchronization storage files.

9. The method of claim 1 wherein said plurality of display devices are configured to display said content using a screensaver application.

10. A system for facilitating delivery of content, said system comprising:
a server;
a plurality of display devices in communication with said server;
a computer in communication with said-server, said computer configured to:
present to a user, using a content manager application having a graphical user interface ("GUI"), a floor plan including a plurality of groups of display devices, said floor plan including markers indicative of locations of each of said plurality of groups and each of said plurality of display devices in each of said plurality of groups;

receive a selection of said content and a first group of display devices by said user using said GUI to select said first group of display devices of said plurality of display devices;

correspond, using the GUI, said selection of said first group of display devices by said user from said floor plan to a first source file in said server associated with said first group of display devices, wherein said server includes a plurality of source files each associated with a different one of said plurality of groups of display devices;

transmit said selected content by said computer to said first source storage file associated with said first group of display devices;

said server configured to:
store said content in said first source storage file associated with said first group of display devices;

provide said content to a group of synchronization storage files associated with said first source storage file, wherein each of said plurality of display devices in said first group of display devices is associated with a respective synchronization storage file in said group of synchronization storage files;

transmit said content from each of said group of synchronization storage files to each respective one of said plurality of display devices in said first group of display devices; and receive a command from said computer to prompt said first group of display devices to check each of said group of synchronization storage files, respectively, to determine if said content is added, and if so, obtain said content from each of said group of synchronization storage files, respectively.

11. The system of claim 10 wherein said content is one of an image, video, or audio data.

12. The system of claim 10 wherein each of said plurality of display devices includes an output display and a personal computer.

13. The system of claim 12 wherein said output display is one of a plasma display panel or a liquid crystal display ("LCD").

14. The system of claim 12 wherein said output display is housed in an enclosure resembling a picture frame.

15. The system of claim 10 wherein said transceiver is one of a Wi-Fi module, a Bluetooth module, or an Ethernet adapter.

16. The system of claim 10 wherein said plurality of display devices are configured to display said content using a screensaver application.

17. The system of claim 10 wherein said storage device is a hard disk.

18. The system of claim 10 wherein said server is configured to provide said content to each of said group of synchronization storage files after receiving a group synchronization command from said computer.

* * * * *